United States Patent [19]

Heidemann et al.

[11] Patent Number: 6,026,116
[45] Date of Patent: Feb. 15, 2000

[54] TRANSMITTING/RECEIVING FACILITY AND METHOD FOR TRANSMITTING BROADBAND SIGNALS AS WELL AS TRANSMITTING/RECEIVING FACILITY FOR RECEIVING BROADBAND SIGNALS

[75] Inventors: Rolf Heidemann, Tamm; Heinz Krimmel, Korntal-Münchingen, both of Germany

[73] Assignee: Alcatel, Paris, France

[21] Appl. No.: 08/979,130

[22] Filed: Nov. 26, 1997

[30] Foreign Application Priority Data

Nov. 27, 1996 [DE] Germany .............................. 196 49 085

[51] Int. Cl.$^7$ .............................. H04B 15/00; H04K 1/00; H04L 27/30
[52] U.S. Cl. .............................................. 375/200
[58] Field of Search .................................... 375/200, 206, 375/208, 296, 207

[56] References Cited

U.S. PATENT DOCUMENTS

| 4,455,651 | 6/1984 | Baran . | |
| 4,912,721 | 3/1990 | Pidgeon, Jr. et al. | 375/200 |
| 5,239,556 | 8/1993 | Ishigaki et al. | 375/200 |
| 5,748,677 | 5/1998 | Kumar | 375/285 |
| 5,903,551 | 5/1999 | Kingston et al. | 370/335 |

FOREIGN PATENT DOCUMENTS

| 0422032 | 2/1996 | European Pat. Off. . |
| 4104096 | 8/1991 | Germany . |

*Primary Examiner*—Chi H. Pham
*Assistant Examiner*—Jean B Corrielus
*Attorney, Agent, or Firm*—Ware, Fressola, Van der Sluys & Adolphson LLP

[57] ABSTRACT

Stationary interference signals from radio stations, for example, enter a transmission network (NET), e.g., a coaxial cable network with return channel, and impair the transmission of broadband signals, e.g., data, in the upstream frequency band, since they lie in the same frequency range. The transmitting/receiving unit (SE1) of a terminal (END) contains a receiving unit (EMP1) for receiving frequency values of stationary interference signals induced in the transmission link, a memory (MEMO1) for storing the received frequency values, a generator (SG1, NG1) for generating a spreading function with spectral zeros at frequency values which are determined from the stored frequency values, and a multiplier (MUL1) for multiplying the broadband signals to be transmitted by the generated spreading function with spectral zeros. The spectral zeros are so generated that, if the spreading function with the spectral zeros is multiplied by the interference signals, at least one of the spectral zeros is located in the frequency range of the broadband signals, so that when the broadband signals are despread at a center (ZE), the impairment caused by the interference signals is reduced.

9 Claims, 4 Drawing Sheets

TRANSMITTING/RECEIVING FACILITY AND METHOD FOR TRANSMITTING BROADBAND SIGNALS AS WELL AS TRANSMITTING/RECEIVING FACILITY FOR RECEIVING BROADBAND SIGNALS

TECHNICAL UNIT

The present invention relates to two transmitting/receiving facilities and a method for transmitting broadband signals, and to two transmitting/receiving facilities for receiving broadband signals.

BACKGROUND OF THE INVENTION

Broadband signals are, for example, request signals or data signals which are transmitted from a subscriber to a center in the upstream frequency band of a distribution network with a return (upstream) channel. EP 0 422 032 B1 discloses a data transmission apparatus for a cable television distribution network with a return channel by means of which data of a subscriber is transmitted to a center (head end) in the upstream frequency band using spread-spectrum techniques. Stationary interference signals caused by broadcasts may enter a cable television distribution network and may adversely affect the transmission of the data in the upstream frequency band, since they lie in the same frequency band. The return channel uses the frequency band 5–30 MHz, for example. For error-free transmission of data at a high bit rate, e.g., 2 Mb/s, no sufficiently large interference-free frequency range is available in the return channel because of the great number of stationary interference signals. During despreading, however, the stationary interference signals are also multiplied by the spreading function and thus spread. As a result, portions of the interference signals appear in the frequency band of the broadband signals and cause a degradation in signal-to-noise performance.

SUMMARY OF THE INVENTION

It is therefore an object of the invention to transmit broadband signals in such a way that they are less susceptible to stationary interference signals.

This object is attained by a transmitting/receiving facility for transmitting broadband signals using spread-spectrum techniques, comprising a receiving unit for receiving frequency values of stationary interference signals which are induced in the transmission link; a memory for storing the received frequency values; a generator for generating a spreading function with spectral zeros at frequency values which are determined from the stored frequency values; and a multiplier for multiplying the broadband signals to be transmitted by the generated spreading function with spectral zeros.

It is also attained by a transmitting/receiving facility for receiving broadband signals modulated using spread-spectrum techniques, comprising a detection unit for detecting frequency values of stationary interference signals; a transmitting unit for transmitting the detected frequency values; a memory for storing the detected frequency values; a generator for generating a spreading function with spectral zeros at frequency values which are determined from the stored frequency values; and a multiplier for multiplying the received broadband signals by the generated spreading function with spectral zeros.

It is still further attained by a method of transmitting broadband signals from a first transmitting/receiving facility to a second transmitting/receiving facility, comprising the steps of: detecting stationary interference signals at the second transmitting/receiving facility and transmitting them to the first transmitting/receiving facility; generating in the first transmitting/receiving facility a spreading function with spectral zeros depending on the frequency values to be transmitted; and multiplying the broadband signals to be transmitted by the spreading function with spectral zeros and transmitting the resulting signal to the second transmitting/receiving facility.

It is also attained by a transmitting/receiving facility for optically transmitting broadband signals using spread-spectrum techniques, comprising: a receiving unit for receiving frequency values of stationary interference signals occurring on an optical link; a memory for storing the received frequency values; a broadband optical source; an electrooptic modulator for modulating the optical output signals from the broadband optical source with the broadband signals to be transmitted; and an optical filter with variable stop frequencies which are varied, at least in part, as a function of the stored frequency values.

It is further attained by a transmitting/receiving facility for receiving broadband signals modulated using spread-spectrum techniques, comprising: a detection unit for detecting frequency values of stationary interference signals; a transmitting unit for transmitting the detected frequency values; a memory for storing the detected frequency values; at least one optical filter with variable stop frequencies which are varied, at least in part, as a function of the stored frequency values; and at least one optical-to-electrical transducer following the at least one optical filter and serving to convert the signals passed by the at least one optical filter from optical to electrical form.

A particular advantage of the invention is that the transmission of the broadband signals is very insensitive to discrete-frequency interference signals. The bit errors that would be caused by the interference signals are reduced.

Furthermore, the invention can be used for transmission over both coaxial cables and fiber optic cables and for radio transmission.

BRIEF DESCRIPTION OF THE DRAWINGS

The invention will become more apparent from the following description of two embodiments when taken in conjunction with the accompanying drawings, in which.

BEST MODE FOR CARRYING OUT THE INVENTION

Figure 1:
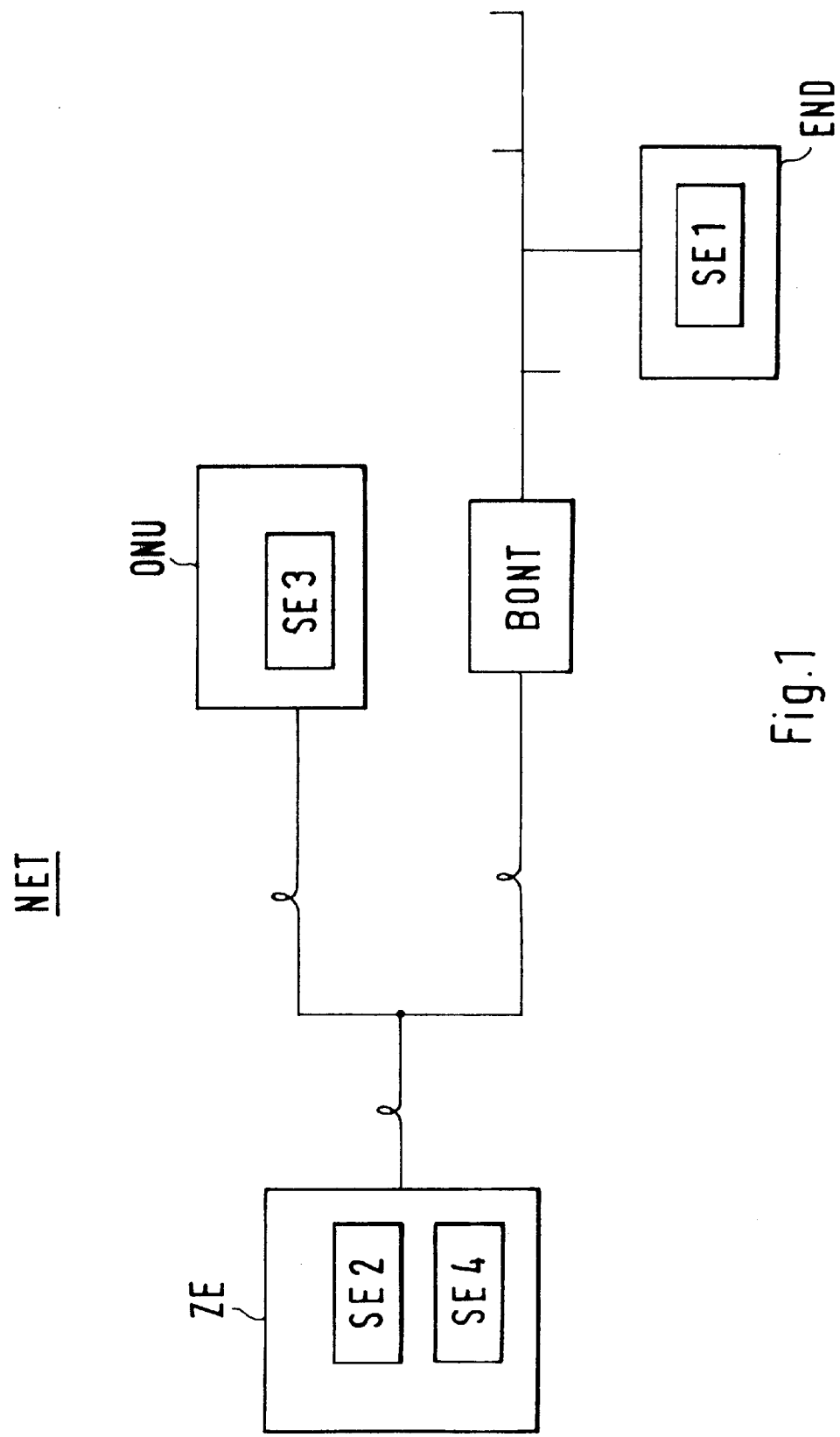
FIG. 1 is an overview block diagram of a transmission network with four transmitting/receiving facilities according to the invention.

The first embodiment will be explained with the aid of FIGS. 1 to 3. FIG. 1 shows a transmission network with four transmitting/receiving facilities according to the invention. The transmission network NET is a hybrid fiber/coax access network with a return channel. The transmission network NET serves, for example, to transmit analog and digital television and video signals as well as data signals from a center ZE to a plurality of terminals END, of which one is shown. The signals to be transmitted are converted from electrical to optical form at the center ZE and transmitted over two distribution networks, consisting of optical fiber cables, e.g., glass fiber cables, and optical splitters, to a number of optical network units ONU and broadband optical network terminations BONT, of which one is shown. Each of the broadband optical network terminations BONT converts the received signals from optical to electrical form and then transmits them over coaxial cables to the terminals END. The video signals are, for example, movies, educational programs, tourism promotion films, or the like, which are selected by subscribers in an interactive mode. The selection of the video signals takes place via the return channel, which occupies the frequency band 5–30 MHz, for example.

The signals in the upstream frequency band are transmitted using spread-spectrum techniques. A broadband signal to be transmitted, e.g., a 2-Mb/s data signal with a bandwidth of 2 MHz, is electrically or optically spread over the entire upstream frequency band or a subdivision thereof. In forming the spreading function, stationary interference signals induced in the transmission link, whose frequency values were previously determined at the center ZE, are taken into account in the electrical case by incorporating spectral zeros into the spreading function at suitable points, and in the optical case by optically filtering the determined frequency values of the stationary interference signals out of the optical signal at the transmitting end, i.e., at the subscriber, so that these frequency values are not transmitted. The electrically spread signal is transmitted electrically over coaxial cables (not shown in FIG. 1) or, after electrical-to-optical conversion in a broadband optical network termination BONT, optically to the center ZE, where in the electrical case it is converted from optical to electrical form prior to despreading.

At the center ZE, the received, electrically spread signal is despread by being multiplied by the spreading function. The despreading of the optically spread signals at the center ZE is accomplished by means of an optical filter which filters the same frequencies as the optical filter used for spreading.

Figure 2:
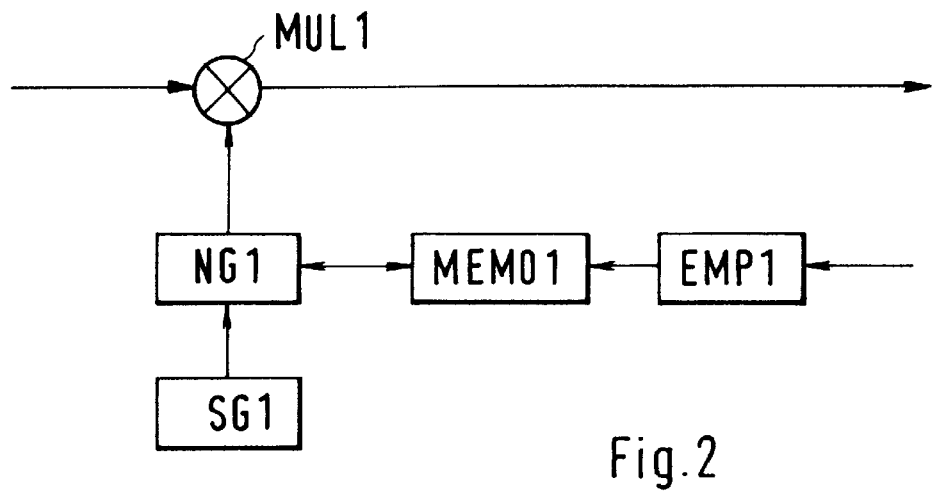
FIG. 2 is a schematic block diagram of a first transmitting/receiving facility according to the invention for the transmission network of FIG. 1.

FIG. 2 shows a first transmitting/receiving facility according to the invention for the transmission network of FIG. 1. The transmitting/receiving facility SE1 serves to transmit broadband signals from a terminal END to the center ZE using spread-spectrum techniques. The transmitting/receiving facility SE1 contains a receiving unit EMP1, a memory MEMO, a spreading-function generator SG1, a zero generator NG1, and a multiplier MUL1.

The receiving unit EMP1 serves to receive frequency values of stationary interference signals which are induced in the transmission link. As described above, the stationary interference signals, e.g., interference signals from broadcast stations, are detected at the center ZE, and at least part of their frequency values are transmitted to the terminal END. To receive these frequency values, the receiving unit EMP1 includes a decoder, for example.

The memory MEMO1 serves to store the frequency values received by the receiving unit EMP1. The memory MEMO1 is, for example, an addressable read/write memory, a so-called RAM (Random Access Memory).

The spreading-function generator SG1 and the zero generator NG1 together form a generator for generating a spreading function with spectral zeros and frequency values which are determined from the stored frequency values.

The spreading-function generator SG1 serves, for example, to generate a spreading function for a pseudorandom 0/180° phase shift keying modulation or a pseudorandom frequency shift keying modulation. The pseudorandom 0/180° phase shift keying shift modulation is known as "direct sequencing", and the pseudorandom frequency shift keying modulation as "frequency hopping"; see, for example, telecom praxis May 1995, pages 9 to 14. The spreading function is, for example, a periodic rectangular function with the values 1 and −1 and the clock frequency F. The clock frequency F is an essential factor determining the transmission bandwidth, e.g., F=25 MHz, which, in turn, is always at least one order of magnitude greater than the bandwidth necessary to transmit the broadband signals, e.g., 2 MHz.

The zero generator NG1 serves to generate spectral zeros and to insert the latter into the generated spreading function. It reads out the stored frequency values of the stationary signals and determines spectral zeros therefrom, which it inserts into the spreading function generated by the spreading-function generator SG1. The spectral zeros are generated in such a way that, when the transmitted spread broadband signals are despread, the interference caused in the frequency range of the broadband signals by the simultaneously occurring spreading of the interference signals is minimal. The spreading of the interference signals with the spreading function with the spectral zeros ideally generates zeros in the frequency range of the broadband signals. The zero generator NG1 contains a digital signal processor, for example.

The multiplier MUL1 serves to multiply the broadband signals by the generated spreading function with spectral zeros. By the multiplication, spreading of the broadband signals is achieved. Prior to the multiplication, the broadband signals have a bandwidth of, for example, 2 MHz. After the multiplication, the bandwidth is, for example, 25 MHz, which corresponds to the 5–30 MHz frequency band of the return channel. The spread broadband signals can thus be transmitted in the return channel. The multiplier MUL1 is constructed from logic gates, for example.

Figure 3:
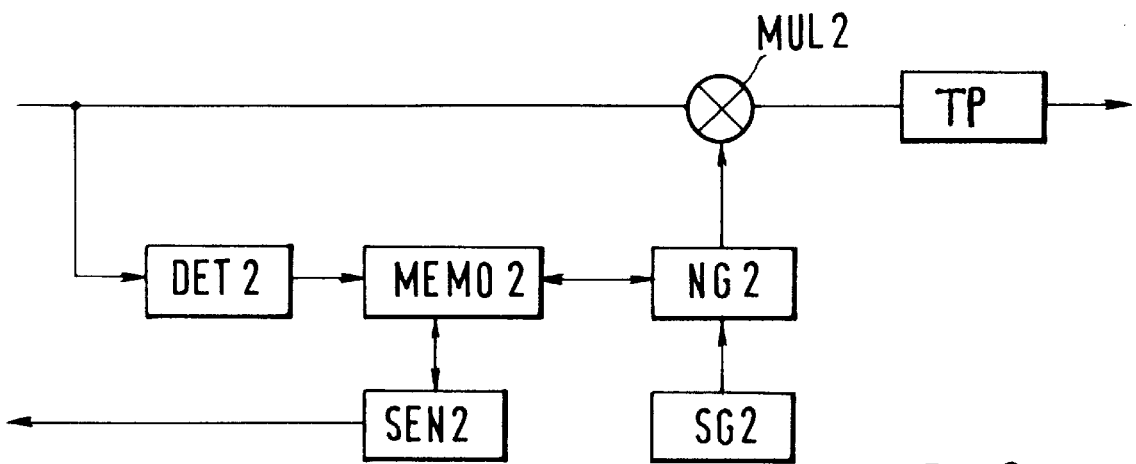
FIG. 3 is a schematic block diagram of a second transmitting/receiving facility according to the invention for the transmission network of FIG. 1.

FIG. 3 shows a second transmitting/receiving facility according to the invention for the transmission network of FIG. 1. The transmission/receiving facility SE2 serves to receive broadband signals modulated using spread-spectrum techniques. It is located at the center ZE and receives the spread signals transmitted by the terminals END. The transmitting/receiving facility SE2 contains a detection unit DET2, a memory MEMO2, a transmitting unit SEN2, a spreading-function generator SG2, a zero generator NG2, a multiplier MUL2, and a low-pass filter TP.

The detection unit DET2 serves to detect the frequency values of stationary interference signals which enter the transmission network NET and appear at the center ZE. It determines, for example, the stationary interference signals in the 5–30 MHz band upon initialization of the transmission network and/or at predetermined time intervals, e.g., periodically. The determination is performed with a scanner, for example. The detection unit DET2 also determines the amplitudes and/or intensities of the received stationary signals and compares the received interference signals with a minimum value. It selects the frequency values with the greatest amplitudes and/or intensities and passes only these frequency values on to the memory MEMO2 and the transmitting unit SEN2. Advantageously, the determination and insertion of spectral zeros is performed only for a limited number of disturbed frequency values, since only the frequency values with the greatest amplitudes and/or intensities have the strongest effect.

The memory MEMO2 serves to store the frequency values which are determined and passed on by the detection unit DET2. It is, for example, an addressable read/write memory, a so-called RAM (Random Access Memory).

The transmitting unit SEN2 serves to transmit the detected frequency values. It reads out the stored frequency values and transmits them to the terminals END using time-division multiplexing, for example.

The spreading-function generator SG2 and the zero generator NG2 together form a generator for generating a spreading function with spectral zeros at frequency values which are determined from the stored frequency values. The spreading function with spectral zeros is the same as that generated in the transmitting/receiving facility SE1.

The spreading-function generator SG2 serves to generate a spreading function for a pseudorandom 0/180° phase shift keying modulation or a pseudorandom frequency shift keying modulation. The spreading function is, for example, a periodic rectangular function with the values 1 and −1 and the clock frequency F. The clock frequency F approximately corresponds to the transmission bandwidth, e.g., F=25 MHz, which, in turn, is always at least one order of magnitude greater than the bandwidth necessary to transmit the broadband signals, e.g., 2 MHz.

The zero generator NG2 serves to generate spectral zeros and to insert the latter into the generated spreading function. It reads out the stored frequency values of the stationary signals and determines spectral zeros therefrom, which it inserts into the spreading function generated by the spreading-function generator SG2. The spectral zeros are generated in such a way that, when the transmitted spread broadband signals are despread, the interference caused in the frequency range of the broadband signals by the simultaneously occurring spreading of the interference signals is minimal. The spreading of the interference signals with the spreading function with the spectral zeros ideally generates zeros in the frequency range of the broadband signals. The zero generator NG2 contains a digital signal processor, for example.

The multiplier MUL2 serves to multiply the received broadband signals by the generated spreading function with spectral zeros. By the multiplication, despreading of the broadband signals is achieved. Prior to the multiplication, the broadband signals have a bandwidth of, for example, 25 MHz; after the multiplication, the bandwidth is 2 MHz, for example. The multiplier MUL2 is constructed from logic gates, for example.

The multiplier MUL2 is followed by the low-pass filter TP. The bandwidth of the low-pass filter TP is at least as wide as the bandwidth of the broadband signals. The low-pass filter TP serves to block the frequency ranges outside the frequency range of the received, despread broadband signals.

The following describes a method for transmitting broadband signals from a transmitting/receiving facility SE1 at a terminal END over a transmission link to a transmitting/receiving facility SE2 at a center ZE.

First, the characteristics of the stationary interference signals, e.g., their frequency values, are detected and stored at the transmitting facility SE2. The stationary interference signals are induced in a coaxial cable, for example. The amplitudes and/or intensities of the detected interference signals are determined and compared with a minimum value. The minimum value indicates, for example, up to which value an interference has no appreciable effect and is therefore tolerable. If the amplitude and/or intensity values of some interference signals are above the minimum value, the frequency values of only these interference signals will be stored, i.e., a selection of the detected interference signals takes place. The stored frequency values are transmitted to the zero generator NG2 in the transmitting/receiving facility SE2 and to the zero generators NG1 in the transmitting/receiving facilities SE1 of the terminals END.

In the transmitting/receiving facility SE1 of each of the terminals END, a spreading function with spectral zeros is generated based on the frequency values received at the respective transmitting/receiving facility SE1. All spreading functions have spectral zeros at the same points. For a transmission using CDMA (Code Division Multiple Access), each spreading function is orthogonal to any other, so that a superposition of all spread spectra formed from the spreading functions remains detectable at the center. The broadband signals to be transmitted by a terminal END are multiplied by the respective spreading function with spectral zeros, and the resulting signal is transmitted to the second transmitting/receiving facility SE2 at the center ZE. At the center ZE, a corresponding spreading function is generated for each terminal END. By multiplying this spreading function by the received signals, or adding it to the received signals, and subsequent filtering, despreading is accomplished. The filtering is done with a low-pass filter TP having at least the same bandwidth as the broadband signals at the first transmitting/receiving facility SE1 for the associated terminal END.

By the use of spread-spectrum techniques, errors caused by nonstationary interference signals induced in the transmission line are reduced. By the additional insertion of spectral zeros in the spreading functions, errors caused by stationary interference signals are minimized as well.

FIG. 4 shows six plots of different signal spectra. In all of the plots, the vertical axis represents the amplitude, and the horizontal axis the frequency.

Figure 4A:
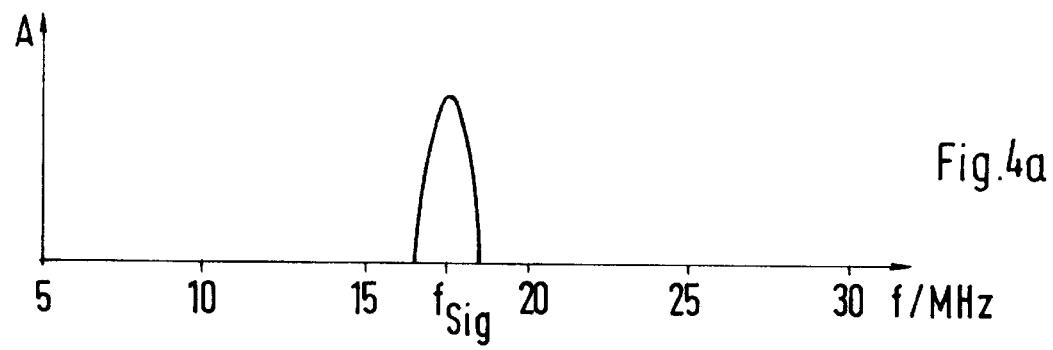
FIGS. 4a–f shows six plots of different signal spectra.

FIG. 4a shows a broadband signal to be transmitted from a terminal END to the center ZE. The broadband signal is, for example, a 2-Mb/s signal with a bandwidth of 2 MHz. The center frequency $f_{Sig}$ is 17.5 MHz, for example.

Figure 4B:
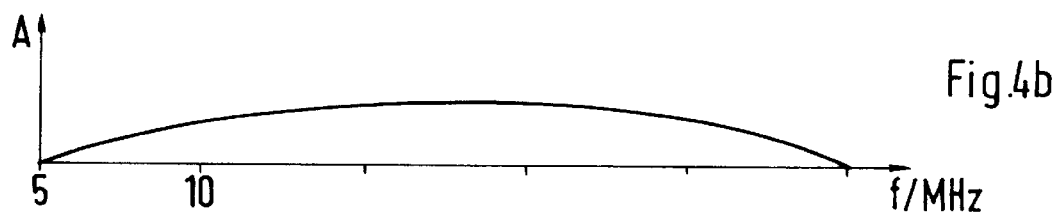

FIG. 4b shows a spreading function without spectral zeros as is commonly used in pseudorandom 0/180° phase shift keying modulation, i.e., in the direct-sequence spread-spectrum technique. The spreading function has a bandwidth of, for example, 25 MHz, so that the broadband signal can be spread over the entire upstream frequency band of 5 to 30 MHz.

Figure 4C:
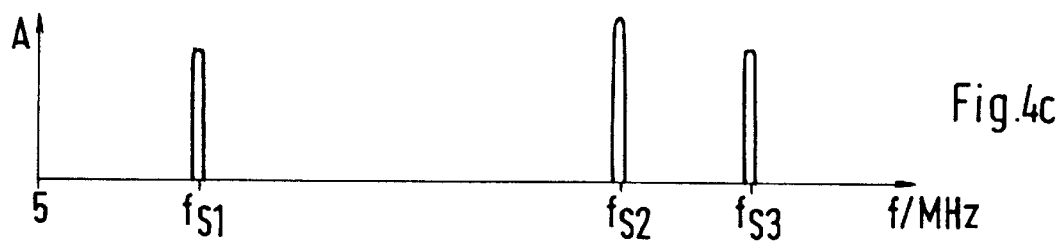

FIG. 4c shows three stationary interference signals which were detected and stored at the center ZE, the first at 10 MHz, the second at 23 MHz, and the third at 27 MHz. The frequency values are exemplary values.

Figure 4D:
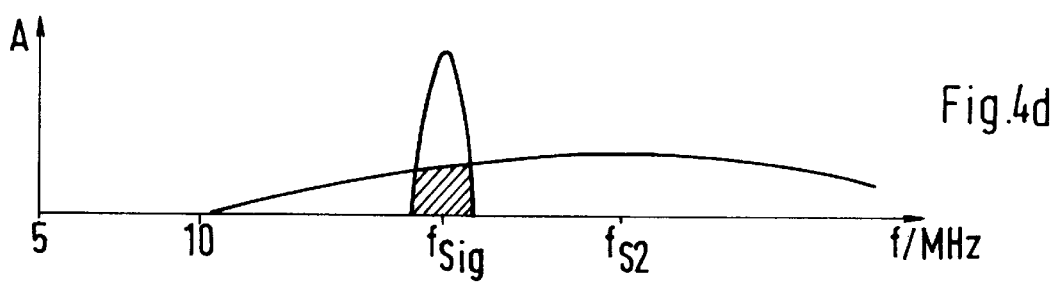

FIG. 4d shows the despread broadband signal at the center ZE and the spread second interference signal. At the center ZE, the spread broadband signal transmitted over the transmission link is received and, by being multiplied by the spreading function of FIG. 4b, despread. In the despreading process, however, the stationary interference signals are also multiplied by the spreading function and thus spread. Consequently, parts of the interference signals appear in the frequency band of the broadband signals and result in a degradation of the signal-to-noise ratio. As an example, the effect of the unintended spreading of the second interference signal during despreading is shown.

Figure 4E:

FIG. 4e shows a spreading function with spectral zeros as is available, for example, at the output of the zero generator NG2. The spreading function has zeros which are determined based on the frequency values of the stationary interference signals, in this example three interference signals. The spectral zeros are so generated that if the spreading function with the spectral zeros is multiplied by the individual interference signals, at least one of the spectral zeros will lie in the frequency range of the broadband signals. For generating the spectral zeros, the following formula is used:

$$f_{Ni} = 2 \times f_{Sig} - f_{Si}$$

where $f_{Ni}$=frequency value of zero i, with i=1, 2, . . . , up to the number of stored interference signals, in this example three signals $f_{Sig}$=center frequency of the broadband signal to be transmitted $f_{Si}$=frequency value of the ith interference signal Thus, taking into account the three interference signals, the zeros of the spreading function are at $f_{N1}$=2×17.5 MHz–10 MHz=25 MHz, $f_{N2}$=2×17.5 MHz–23 MHz=12 MHz, and $f_{N3}$=2×17.5 MHz–27 MHz=8 MHz.

Figure 4F:
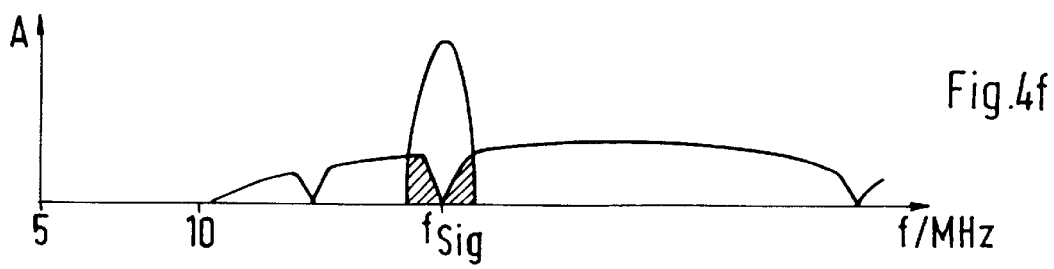

FIG. 4f shows the broadband signal at the center ZE, spread with the spreading function of FIG. 4e and transmitted over the transmission link and despread with the spreading function of FIG. 4e, and the second interference signal, despread with the spreading function of FIG. 4e. Through the zero $f_{N2}$ in the spreading function with spectral zeros, a spread spectrum having a zero at the center frequency $f_{Sig}$ of the broadband signal is generated during the spreading of the second interference signal. This reduces the influence of interference signal on the the signal-to-noise ratio.

Figure 5:
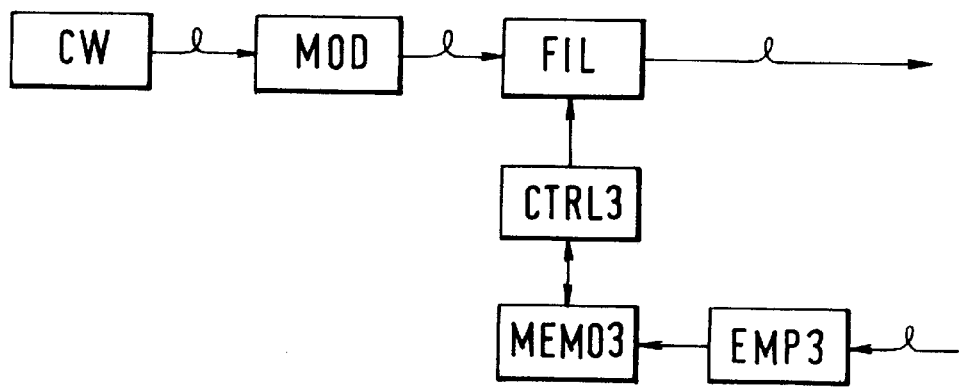
FIG. 5 is a schematic block diagram of a third transmitting/receiving facility according to the invention for the transmission network of FIG. 1.

The second embodiment will be explained with the aid of FIGS. 5 and 6. FIG. 5 is a schematic block diagram of a third transmitting/receiving facility according to the invention for the transmission network of FIG. 1. The transmitting/receiving facility SE3 serves to optically transmit broadband signals from an optical network unit ONU over optical fibers to the center ZE using spread-spectrum techniques. The broadband signals to be transmitted originate from one or more terminals and are fed to the optical network unit ONU over coaxial cable, for example. The optical network unit ONU contains a receiving unit EMP3, a memory MEM03, a broadband optical source CW, an electrooptic modulator MOD, a control unit CTRL 3, and an optical filter FIL.

The receiving unit EMP3 serves to receive frequency values of stationary interference signals occurring on the optical transmission link to the center ZE. The stationary interference signals are measured and temporarily stored at the center ZE and transmitted from the latter to all optical network units ONU. The receiving unit EMP3 corresponds, for example, to the receiving unit EMP1 of the transmitting/receiving facility SE1 with a preceding optical-to-electrical transducer.

The memory MEMO3 serves to store the received frequency values. It corresponds to the memory MEMO1 of the transmitting/receiving facility, for example.

The broadband optical source CW contains, for example, a fiber-optic amplifier which generates light with a continuous frequency spectrum. The bandwidth of the spectrum is, for example, ten times the bandwidth of the broadband signals.

The electrooptic modulator MOD serves to modulate the optical output signals from the broadband optical source CW with the broadband signals to be transmitted. During the modulation, the bandwidth of the broadband signals is spread to its tenfold value, for example.

Instead of the separate broadband optical source CW and the separate electrooptic modulator MOD, a directly modulated broadband light source, such as a directly modulated light-emitting diode, can be used. The control unit CTRL3 is a digital signal processor, for example. It serves to control the optical filter FIL.

The optical filter FIL has variable stop frequencies which are determined, at least in part, from the stored frequency values. The optical filter FIL serves to filter frequencies out of the continuous spectrum. On the one hand, those frequencies which are set individually for each terminal using CDMA are filtered out. On the other hand, those frequencies which are identical with the stored frequency values are filtered out, so that the transmission is independent of and unaffected by the stationary interference signals. The frequencies which are not passed on are the stop frequencies.

Figure 6:
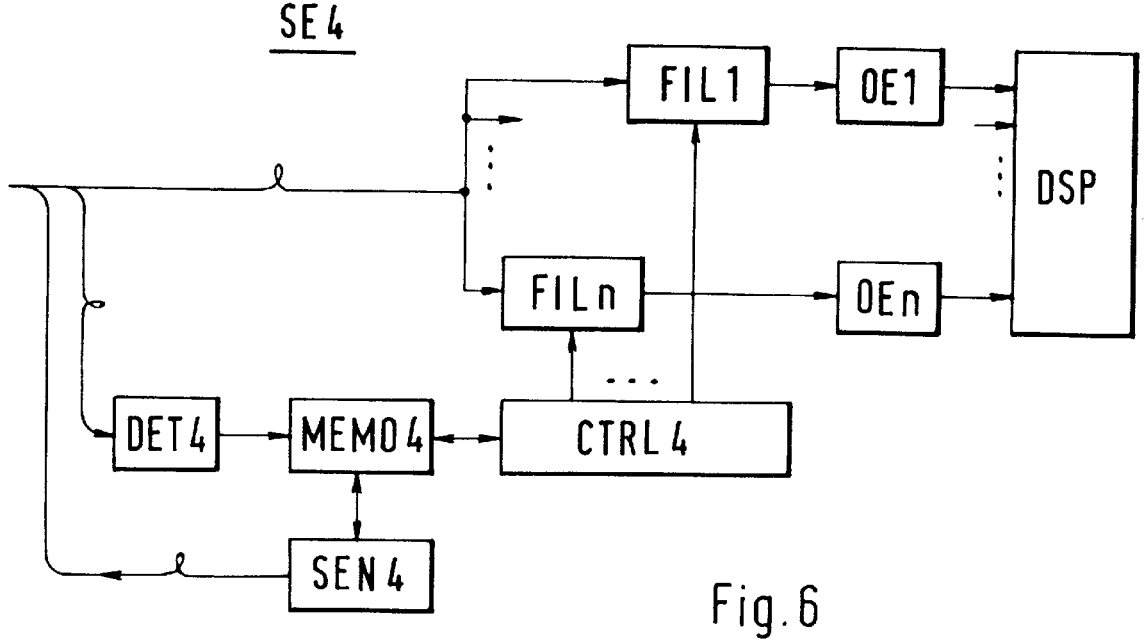
FIG. 6 is a schematic block diagram of a fourth transmitting/receiving facility according to the invention for the transmission network of FIG. 1.

FIG. 6 shows a schematic block diagram of a fourth transmitting/receiving facility according to the invention for the transmission network of FIG. 1. The transmitting/receiving facility SE4 serves to despread the broadband signals transmitted by the optical network units ONU. It includes a plurality of optical filters FIL1 to FILn, with n=1, 2, 3, . . . , which all have variable stop frequencies. The optical filters FIL1 to FILn are controlled by a control unit CTRL. Each of the optical filters FIL1 to FILn is followed by a respective optical-to-electrical transducer OE1 to OEn, with n=1, 2, 3, . . . . The evaluation of the despread signals takes place in a digital signal processor DSP, which may also perform the control function of the control unit CTRL4 for the filters FIL1 to FILn.

The transmitting/receiving facility SE4 further includes an optical-to-electrical transducer OE, a detection unit DET4, a memory MEM04, and a transmitting unit SEN4.

The detection unit DET4, the memory MEMO4, and the transmitting unit SEN4 correspond, respectively, to the detection unit DET2, the memory MEMO2, and the transmitting unit SEN2 of FIG. 3 and perform the same functions. The detection unit DET4 and the transmitting unit SEN4 additionally include an optical-to-electrical transducer and an electrical-to-optical transducer, respectively. Stationary inference signals are thus detected, stored, and fed through the control unit CTRL to the optical filters FIL1 to FILn, and their frequency values are transmitted to the optical network unit or units ONU. In the optical filters FIL1 to FILn and the subsequent optical-to-electrical transducers OE1 to OEn, the received broadband signals are despread by filtering the frequencies individual to each terminal, depending on the individual code determined by CDMA, and the frequency values of the stationary interference signals out of the received signals and subsequently converting the passed signals to electric signals with, e.g., a photodiode. The electric signals can then be processed by the digital signal processor DSP.

Both embodiments are limited to line transmission. The invention can also be used in radio systems, for example. Because of the high traffic volume in mobile radio or radio relay systems, for example, alternative transmission techniques are needed which are less sensitive to interference than, for example, pure CDMA. In addition, stationary interference signals from broadcast stations, for example, have an increased effect, since they are not attenuated by the shielding of a transmission line and are thus in the same transmission medium, namely air.

What is claimed is:

1. A transmitting/receiving facility (SE1) for transmitting broadband signals using spread-spectrum techniques, comprising:

a receiving unit (EMP1) for receiving frequency values of stationary interference signals which are induced in the transmission link;

a memory (MEMO1) for storing the received frequency values;

a generator (SG1, NG1) for generating a spreading function with spectral zeros at frequency values which are determined from the stored frequency values; and a multiplier (MUL1) for multiplying the broadband signals to be transmitted by the generated spreading function with spectral zeros.

2. A transmitting/receiving facility (SE1) as claimed in claim 1, characterized in that the generator (SG1, NG1) comprises a spreading-function generator (SG1) for generating spreading function, wherein the spreading function is for a pseudorandom 0/180° phase shift keying modulation or a pseudorandom frequency shift keying modulation, and further comprises a zero generator (NG1) for generating spectral zeros and inserting them into the generated spreading function, and that the spectral zeros are generated such that if the spreading function with the spectral zeros is multiplied by the interference signals, at least one of the spectral zeros is located in the frequency range of the broadband signals.

3. A transmitting/receiving facility (SE2) for receiving broadband signals modulated using spread-spectrum techniques, comprising:

a detection unit (DET2) for detecting frequency values of stationary interference signals;

a transmitting unit (SEN2) for transmitting the detected frequency values;

a memory (MEMO2) for storing the detected frequency values;

a generator (SG2, NG2) for generating a spreading function with spectral zeros at frequency values which are determined from the stored frequency values; and a multiplier (MUL2) for multiplying the received broadband signals by the generated spreading function with spectral zeros.

4. A transmitting/receiving facility (SE2) as claimed in claim 3, characterized in that the detection unit (DET2) determines the amplitudes and/or intensities of the received stationary interference signals and, after comparing the amplitude and/or intensity values with a minimum value, selects the frequency values with the greatest amplitudes and/or intensities, and that only these frequency values are passed on to the memory (MEMO2) and to the transmitting unit (SEN2).

5. A transmitting/receiving facility (SE2) as claimed in claim 3, characterized in that the generator (SG2, NG2) comprises a spreading-function generator (SG2) for generating the spreading function, wherein the spreading function is for a pseudorandom 0/180° phase shift keying modulation or a pseudorandom frequency shift keying modulation, and further comprises a zero generator (NG2) for generating spectral zeros and inserting them into the generated spreading function, and that the spectral zeros are generated such that if the spreading function with the spectral zeros is multiplied by the interference signals, at least one of the spectral zeros is located in the frequency range of the broadband signals.

6. A transmitting/receiving facility (SE2) as claimed in claim 3, characterized in that the transmitting/receiving facility (SE2) comprises a low-pass filter (TP) which follows the multiplier (MUL2) and has a bandwidth at least equal to the bandwidth of the broadband signals.

7. A method of transmitting broadband signals from a first transmitting/receiving facility (SE1) to a second transmitting/receiving facility (SE2), comprising the steps of:

detecting frequency values of stationary interference signals at the second transmitting/receiving facility (SE2) and transmitting them to the first transmitting/receiving facility (SE1);

generating in the first transmitting/receiving facility (SE1) a spreading function having spectral zeros depending on the detected frequency values; and multiplying by the spreading function the broadband signals to be transmitted and transmitting the resulting signal to the second transmitting/receiving facility (SE2), thereby providing received signals.

8. A method as claimed in claim 7, characterized in that in the second transmitting/receiving facility (SE2), the received signals are multiplied by a spreading function having spectral zeros at the same points as the spreading function generated in the first transmitting/receiving facility (SE1).

9. A method as claimed in claim 7, characterized in that in the second transmitting/receiving facility (SE2), the received signals, after being multiplied, are filtered with a low-pass filter (TP) having at least the same bandwidth as the broadband signals of the first transmitting/receiving facility (SE1).

* * * * *

UNITED STATES PATENT AND TRADEMARK OFFICE
CERTIFICATE OF CORRECTION

PATENT NO : 6,026,116
DATED : February 15, 2000
INVENTOR(S) : Heidemann et al.

It is certified that error appears in the above-identified patent and that said Letters Patent is hereby corrected as shown below: On the title page: Item.

[56] References Cited

U.S. PATENT DOCUMENTS 4,455,651, 6/1984 Baran should read

--4,455,651, 6/1984 Baran .......... 370/104--.

In column 9, line 20, after "generating" --the-- should be inserted.

Signed and Sealed this

Nineteenth Day of December, 2000

Attest:

Q. TODD DICKINSON

Attesting Officer     Commissioner of Patents and Trademarks